United States Patent
Foley (10) Patent No.: US 10,049,783 B2
(45) Date of Patent: Aug. 14, 2018

(54) UTILIZING NANOSCALE MATERIALS AS DISPERSANTS, SURFACTANTS OR STABILIZING MOLECULES, METHODS OF MAKING THE SAME, AND PRODUCTS PRODUCED THEREFROM

(76) Inventor: Mike Foley, Townshend, VT (US)

( * ) Notice: Subject to any disclaimer, the term of this patent is extended or adjusted under 35 U.S.C. 154(b) by 905 days.

(21) Appl. No.: 12/932,221

(22) Filed: Feb. 18, 2011

(65) Prior Publication Data

US 2011/0210282 A1    Sep. 1, 2011

Related U.S. Application Data (60) Provisional application No. 61/338,413, filed on Feb. 19, 2010, provisional application No. 61/314,678, filed on Mar. 17, 2010.

(51) Int. Cl.
   *H01B 1/24*     (2006.01)
   *H01B 1/00*     (2006.01)
   (Continued)

(52) U.S. Cl.
   CPC .............. *H01B 1/24* (2013.01); *B82Y 25/00* (2013.01); *B82Y 30/00* (2013.01); *H01F 1/0054* (2013.01)

(58) Field of Classification Search
   CPC .......... B82Y 25/00; B82Y 30/00; H01B 1/24; H01F 1/0054
   (Continued)

(56) References Cited

U.S. PATENT DOCUMENTS

| 6,875,374 | B1* | 4/2005 | Zhan et al. | 252/502 |
| 2004/0136894 | A1* | 7/2004 | Yoshizawa et al. | 423/447.2 |
| 2005/0064167 | A1* | 3/2005 | Mao et al. | 428/292.1 |

FOREIGN PATENT DOCUMENTS

| JP | 2007-063107 | * | 3/2007 | C01B 31/02 |

OTHER PUBLICATIONS

Carbon nanotube sheets for the use as artificial muscles; Vohrer et al.; Carbon 42 (2004) 1159-1164.*

(Continued)

*Primary Examiner* — Shuangyi Abu Ali
(74) *Attorney, Agent, or Firm* — Thomas A. O'Rourke; Bodner & O'Rourke, LLP (57) ABSTRACT

Novel dispersions of nanoparticles such as carbon nanotubes, carbon nanofibers, boron nanotubes, clay nanotubes, other nanotube species, buckminster fullerenes, graphene, graphene nanoplatelets, elements, oxides, nanoparticles, nanoclusters, nanopowders, nanocrystals, nanoscale molecules, other nanoscale materials, as well as products produced therefrom are described. These dispersions can then be further processed into a wide variety of products including but not limited to composite materials, polymers, resins, epoxies, emulsions, cements, coatings, clays, films, membranes, paper, fibers, inks, paints, pastes, electronics, spintronics, optics, biotechnology materials, electrodes, field emission or other displays, plating, capacitance, ceramics, catalysts, clays, ballistic materials, drug delivery, doping, magnetics, dielectrics, barrier layers, selective ion flow membranes, batteries, fuel cells, solar and other applications. The invention can also be used to protect electronics from electromagnetic interference, radio frequency interference or radio frequency identification. Most applications that utilize nanoparticles can benefit from this invention.

31 Claims, 2 Drawing Sheets

(51) Int. Cl.
- *H01B 1/22* (2006.01)
- *H01F 1/01* (2006.01)
- *C09K 15/02* (2006.01)
- *B82Y 30/00* (2011.01)
- *B82Y 25/00* (2011.01)
- *H01F 1/00* (2006.01)

(58) Field of Classification Search
USPC .......................................... 106/472; 977/742
See application file for complete search history.

(56) References Cited

OTHER PUBLICATIONS

Geometric control and tuneable pore size distribution of buckypaper and buckydiscs;Whitby et al.; C A R B ON 4 6 ( 2 0 0 8) 9 4 9-9 5 6.*

Kim J., et al., Graphene Oxide Sheets at Interfaces; J. Am. Chen. Soc. 132 (23), 2010.

Zhang, et al.; Graphene Oxide-Assisted Dispersion of Pristine Multiwalled Carbon Nanotubes in Aqueous Media, J. Phys. Chem. C, 2010, 114 (26), pp. 11435-11440.

\* cited by examiner

FIGURE 1

Process Flow for Liquid Phase Dispersions

FIGURE 2

Process Flow for Solid Phase Dispersions

UTILIZING NANOSCALE MATERIALS AS DISPERSANTS, SURFACTANTS OR STABILIZING MOLECULES, METHODS OF MAKING THE SAME, AND PRODUCTS PRODUCED THEREFROM

CROSS-REFERENCE TO RELATED APPLICATION

This application claims the benefit of U.S. Provisional Application No. 61/338,413 filed on Feb. 19, 2010, the disclosures of which is incorporated herein in its entirety.

This application claims the benefit of U.S. Provisional Application No. 61/314,678 filed on Mar. 17, 2010, the disclosures of which is incorporated herein in its entirety.

STATEMENT REGARDING FEDERALLY SPONSORED RESEARCH OR DEVELOPMENT

Not Applicable

REFERENCE TO A "COMPUTER LISTING APPENDIX SUBMITTED ON A COMPACT DISK"

Not Applicable

FIELD OF THE INVENTION

The present invention relates to nanoparticle dispersions and utilization of these dispersions in a variety of applications. Stable and effective dispersion of the nanoparticles provides significant benefits.

BACKGROUND OF THE INVENTION

Many people working with nanomaterials such as carbon nanotubes, buckminster fullerenes, and graphene nanoplatelets have relied on dispersants, surfactants or stabilizing molecules, such as polyvinyl pyrrolidone, sodium dodecyl benzene sulfonate, octyl phenol ethoxylate, or other surfactants to achieve a stable and effective dispersion of the nano particles in the media of choice. This is frequently required for further utilization and incorporation into other products.

Many of these materials do not disperse well in liquid or solid phase dispersion processes, are hydrophobic, and are highly prone to intermolecular Van der Waals forces which make them start to reagglomerate soon after the dispersion process has finished. Working with solid phase processes poses an additional health and safety concern. The nanomaterials can become airborne and thus present an inhalation hazard or provide for other routes of entry into the human body. Dispersion issues have hampered the wide spread acceptance of these nanoparticles by industry. Achieving a stable dispersion that can be further processed by industry remains challenging. Typically, surfactants such as Polyvinyl Pyrrolidone (PVP), Sodium Dodecyl Sulfonate (SDS) Sodium Dodecyl Benzene Sulfonate (SDBS), octyl phenol ethoxylate, or other dispersants, surfactants or stabilizing molecules are used to keep the nanotubes, fullerenes, graphene, or graphene nano platelets well separated and dispersed in the solvent of choice. However, these surfactants interfere with the nanomaterials mechanical, kinetic, optical, electrical or thermal conductivity properties which many people working with these materials desire to exploit and the surfactant often must be removed by repeated washing and rinsing or heating. Some surfactants like PVP can't be successfully removed.

The alternative method of dispersing nanoparticles in the liquid phase involves adding functional groups to the nanoparticles being utilized which also introduces defects to their physical structure and negatively effects some of their inherent properties such as mechanical strength and conductivity. The intermolecular Van der Waals forces present in the nanotubes, buckminster fullerenes, graphene, or graphene nanoplatelets make these nanoparticles especially prone to reagglomeration which is detrimental to their use by research and industry.

OBJECTS OF THE INVENTION

One object of the invention is to produce novel organic or aqueous dispersions of a first nanoparticle. The nanoparticle may include but is not limited to carbon nanotubes, nanofibers, other nanotubes species, graphenes, fullerenes, graphene oxide, graphene nanoplatelets, hybrid materials thereof, or other nanoscale materials. The first nanoparticle utilizes a second nanoscale material as the dispersant, surfactant, or stabilizing molecule. This promotes the advantageous effect of using a material as a dispersant which can impart its own mechanical, optical, kinetic, or conductive properties to the end product. The effect is especially pronounced when using allotropes of carbon as the material functioning as a surfactant.

Another object of the invention is to produce a hybrid material in powder form which already has a material performing a dispersant, surfactant, or stabilizing molecule action added to it and can easily be processed for further use.

Yet another object of the invention is to provide a method of adding conducting, semiconducting, magnetic, optical, or other nanoscale elemental materials or derivatives thereof to the dispersion thus providing a doping effect in the final product.

A further aspect of the invention is to provide for the use of novel materials as dispersants, surfactants, stabilizing molecules, or combinations of materials some of which are mechanically tough and conductive. By utilizing nanoscale materials such as allotropes of carbon, the inherent properties of the nanoscale allotropes of carbon can be used with great effect to increase the mechanical, optical, kinetic, or conductive properties in the final product. The nanomaterials can absorb on the interfaces of the first nanoscale material and the solvent thus promoting the suspension of the first nanoscale material in the solvent being used.

Yet another aspect of this invention is to produce suspensions of nanoscale materials that are stable over time. As such, 100% of the first nanoscale material dispersed in accordance with this invention remains in solution for at least 24 hours. At least 90% of the nanoscale material remains in solution for at least 48 hours. At least 80% of the nanoscale material remains in solution for at least one week. At least 70% of the nanoscale material remains in solution for greater than one week.

SUMMARY OF THE INVENTION

The present invention includes but is not limited to stable dispersions of a first nanoscale material, a second nanoscale material performing as a dispersant, surfactant, or stabilizing molecule action, and a solvent over time. The first nanoparticle may be the same as or different from the second nanoparticle. In a preferred embodiment the second nanoparticle is a different nanoparticle.

The solution is formed by adding a first nanoscale material, a second nanoscale material providing a dispersant, surfactant, or stabilizing molecule action, a solvent. The blend is then processed such as by ultrasonication to disperse the particles, thus creating the solution. The present invention provides for effective dispersion of carbon nanotubes, other nanotube species, carbon nanofibres, fullerenes, graphene, graphene oxide, graphene nanoplatelets, nanoscale elements or derivatives thereof, nanoscale oxides or derivatives thereof, nanoscale nitrides or derivatives thereof, hybrid materials comprised of at least two of the above materials, as well as other carbonaceous, boronic, or graphitic nano materials with nanoscale elements, particularly allotropes of carbon in a liquid or solid phase dispersion processes. Other elements such as nanoscale zinc oxide have been tested and found to function in the same manner. More specifically the invention provides a novel method to create stable dispersions of nanoparticles with minimal interference of the desired nanoparticle's properties. In certain applications of this invention, the mechanical, kinetic, optical, electrical or thermal conductivity properties can be enhanced or even dramatically increased by practicing this invention due to the inherent properties of the material providing a dispersant, surfactant, or stabilizing molecule action. This effect is especially pronounced when using allotropes of carbon for this purpose. By selecting the proper nanoscale material to use as a dispersant one can gain the advantage of having a dispersant that is well suited to the end use of the product. For example, nanoscale zinc oxide can be used as a reinforcing agent in rubber or as a UV absorber in plastics. If using carbon nanotubes, fullerenes, graphene, or graphene nanoplatelets for this application then zinc oxide is a good choice to use as a dispersant, surfactant, or stabilizing molecule. Additionally, a mixture or hybrid material of zinc oxide and a nanoscale allotrope of carbon can be employed in the same manner. The second nanomaterial being used as a dispersant, surfactant, or stabilizing molecule can be absorbed on the interfaces of the first nanoscale material and the solvent thus promoting suspension in the solvent being used.

The present invention overcomes the above-described problems occurring in the prior art. One aspect of the present invention includes providing a novel dispersant for carbon nanotubes, buckminster fullerenes, graphene, graphene nanoplatelets, and other nanoparticles by utilizing allotropes of carbon, other nanoscale elements and derivatives thereof, or a mixture of allotropes of carbon and other nanoscale elements in lieu of dispersants, surfactants, or stabilizing molecules thus gaining the advantage of the intrinsic strength and conductivity of the allotropes of carbon. Another aspect of the invention includes utilizing nanoscale elements as a dispersant to suspend the above nanoparticles. Other nanoscale elements can be incorporated into the mixture to provide a doping effect. This is desirable for certain applications such as films, graphene paper, or buckypaper. Furthermore, this invention can be practiced even when neither the nanoparticle being used nor the nanoparticle functioning as a surfactant is miscible with the solvent. The particles can be used in functionalized or non functionalized form to promote the dispersion in a wide variety of media such as Isopropanol (IPA), Di water, Ethanol, Methanol, Toluene, N-Methylpyrrolidone (NMP), Dimethylformamide (DMF), other solvents, or mixtures of solvents.

A significant benefit of this invention is that the need to remove the dispersant, surfactant, or stabilizing molecules is negated. This is due the nanoscale materials such as allotropes of carbon having their own desirable mechanical, optical, kinetic, or conductive properties. This is significant because in the prior art, some surfactants like poly vinyl pyrrolidone (PVP) can't be removed from the CNT dispersion liquid and they interfere with the end use when applied to a thin film or other products. Other examples in the prior art involve washing and rinsing in solvents which can lead to poor performance such as the cracking of films made from the dispersion. Additionally, this invention presents a way to add a dispersant to carbon nanotubes or other nano particles in liquid form and then remove the solvent producing a hybrid material of nanoparticles with the dispersant which was used and the hybrid material can then be further processed. A solid phase process can also be employed producing the same hybrid material.

DETAILED DESCRIPTION

Figure 1:
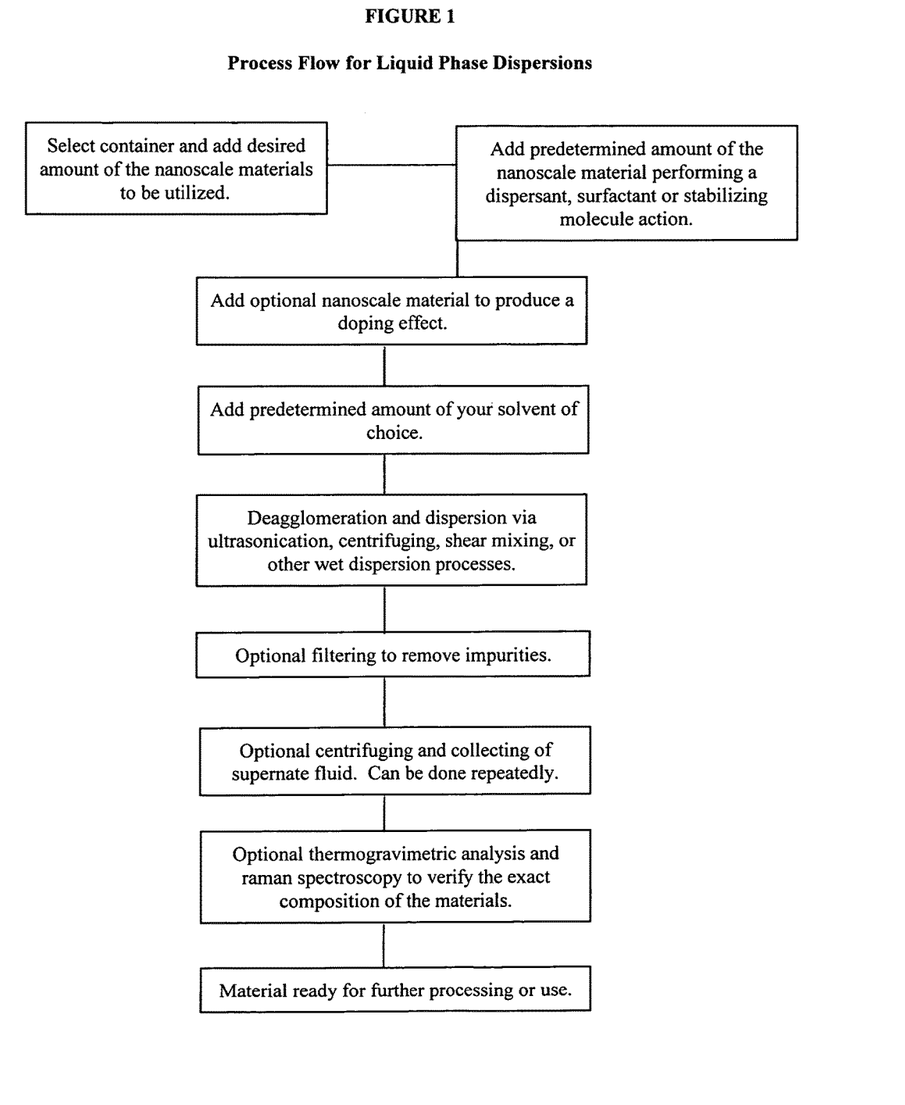
FIG. 1—a flowchart of the process flow for dispersions of nanoparticles to further processed in liquid form.
Figure 2:
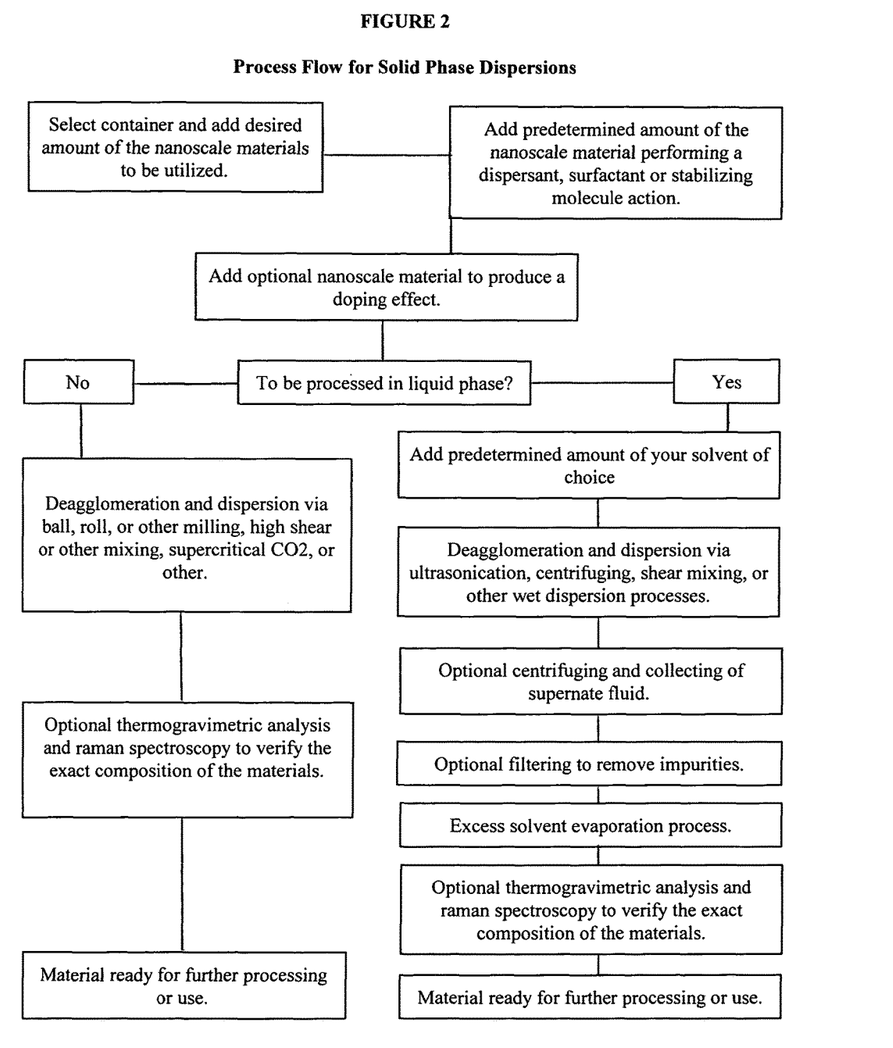
FIG. 2—a flowchart of the process flow for dispersions of nanoparticles to further processed in solid form.

For a liquid phase dispersion, the $1^{st}$ nanoparticle is preferably in powder form. The nanoparticle may be in functionalized or non functionalized form. The first nanoparticle is typically added to a container to form a blend with a solvent. The first nanoparticle is present in an amount of about 1-5 wt % for the solution. For example, a 5 wt % carbon nanotubes solution would have 50 grams per liter of solvent. The $2^{nd}$ nanoparticle, which can be either functionalized or non functionalized, and is functioning as a dispersant, surfactant, or stabilizing molecule in powder form is then added to the container in an amount which is typically 5-125 wt % of the $1^{st}$ nanoparticle for most applications. The amount of the $2^{nd}$ nanoparticle needs to be enough to suspend the $1^{st}$ nanoparticle in the volume of the liquid being used. The amount of the $2^{nd}$ nanoparticle or nanoparticle blend can be altered depending on the solubility of the material in the particular solvent being used.

If making transparent conductive coatings or other films, it may be desirable to use the $2^{nd}$ nanoparticle in higher quantities than the $1^{st}$ nanoparticle. Research indicates that multiples of the $1^{st}$ nanoparticle, typically 100-500 wt % can be used for these applications. In many applications it is desirable to use a minimal amount of of the $2^{nd}$ material typically 5-125 wt % of the first particle can be used in these applications.

In one embodiment, there is about 1 to about 5 weight percent of a first nanoparticle and the balance is the solvent that the nanoparticle is to be dispersed in. The second nanoparticle is present in an amount of about 5-125 wt % of the first particle. In a preferred embodiment the second nanoparticle is present in an amount of about 10-110 wt % of the first nanoparticle. In a more preferred embodiment the second nanoparticle is present in an amount of about 20-100 wt %. In a most preferred embodiment the second nanoparticle is present in an amount of about 25 to about 90% of the of the first nanoparticle.

Hybrid materials including but not limited to mixtures of carbon nanotubes, graphene, graphene oxide, graphene nanoplatelets, or fullerenes can also be employed as the $1^{st}$ or $2^{nd}$ nanoscale material. An example of this is a graphene or graphene oxide sheet with buckminster fullerenes bonded to it. Hybrid materials of conducting, semiconducting, optical, and magnetic materials can also be used as the $2^{nd}$ nanoscale material or as dopants. The solvent is then added in the predetermined quantity to make the solution with the desired loading as detailed above. The materials can be added in any order. For instance, the $1^{st}$ nanoparticle in powder form is added to the container followed by the $2^{nd}$ nanoparticle in powder form being added in the desired quantity and finally the solvent is added and they are mixed simultaneously. Alternatively, you can dissolve the either the $1^{st}$ or $2^{nd}$ nano particle into the solvent and sonicate it prior to adding the other nanoparticle. Furthermore, it may be desirable to add a third material being other nanoscale materials or mixture of these materials to the mixture thus providing a doping effect in the end product. It may also be desirable to blend the $2^{nd}$ nanoparticle and the third nanoscale material being an element or derivative thereof to produce a dispersant, surfactant, or stabilizing molecule that has the strength and conductivity properties of the nanoscale allotropes of carbon with the elemental dopant effect incorporated into it. The materials being used as dopants can be conducting, semiconducting, optical, or magnetic. It may be desirable to add forth material being a dispersing agent such as polyvinyl pyrrolidone (PVP) sodium dodecyl benzene sulfonate (SDBS), cetyl trimethylammonium bromide, octyl phenol ethoxylate, amino acids or derivatives thereof in very small quantities which are substantially less than would typically be employed to disperse the same nanoparticles to the mixture, however it is not necessary. As little as 0.05% of an amino acid derivative up to about 9% can improve the overall dispersion of the $1^{st}$ nanoscale material, although higher amounts can be used. In certain applications the fourth material is added to produce a positive or negative charging effect in the liquid which can then be coated onto a substrate by electrophoretic deposition, plating, or other methods where a positive or negative charge is desirable.

Preferably the dispersions are made at ambient temperature, typically about 60-80 degrees Fahrenheit. There are applications where it is necessary to cool the dispersion during processing. This is typically done with a water, ice, or combination water & ice bath. Dispersion is typically done with a probe style sonicator but a bath style sonicator, blender, homogenizer, or high shear mixer can also be employed. It is desirable to pulse the sonicator on and off so as not to shorten the length of the CNTs. Due to the possible presence of defects in the CNTs structure, constant sonication often causes breaking at locations where the defects are present. Research shows that pulsing the sonicator for 30 seconds on then 30 seconds off can mitigate this effect. Pulsing also helps with keeping the solution from heating up during processing. The off cycle can be longer, if desired, to keep the solution at a constant temperature. It is also possible to control the temperature by attaching a temperature probe to the controller for the sonicator. The sonicator will stop processing the solution every time the solution reaches the maximum temperature as programmed. A flow cell can also be used. The flow cell will keep recirculating the solution while sonicating a small amount of it over a period of time.

Functionalized nanotubes or other nanoparticles are typically made with wet chemistry. Wet chemistry is indiscriminate and can create defects in the structure of the carbon nanotubes or other nanoparticles being functionalized. A different method exists. Functionalization can be done in a solid phase or dry state. This method is superior because the process has high structural integrity and it does not add defects into the lattice structure of the material. Wet or dry functionalized nanoparticles can be used in practicing this invention. Significant benefits in the conductivity of the coatings made by practicing this invention or in other applications can be realized if using a dry functionalization process.

In certain applications such as films, buckypapers, polymers, or composites, it may be desirable to add other nanoparticles to introduce a doping effect to the mixture. For example, if magnetic properties are desired, nanoscale nickel, iron, neodymium, or other materials can be added. If semiconducting properties are desired, nanoscale semiconducting materials such as diamond, silicon, germanium or others can be added.

While it is desirable to use any of the materials detailed in this patent application as the second nanoscale material providing a dispersant, surfactant, or stabilizing molecule action, allotropes of carbon are desirable due to their intrinsic strength, conductivity, as well as other properties. Buckminster fullerenes and carbon nanotubes are generally considered to be from the same family of materials but there are significant differences. The main difference being that buckminster fullerenes are spheroidal in shape and typically have a diameter of approximately 1 nanometer while carbon nanotubes are tubular in shape and come in a wide range of diameters from single walled nanotubes having a 1-2 diameter to multi walled nanotubes having diameters ranging from 2-100 nanometers. There are also differences between buckminster fullerenes and graphene, graphene oxide, graphene nanoplatelets and hybrid materials thereof. For example, you can have a graphene or a graphene oxide sheet with a buckminster fullerene bonded to it.

There are significant differences between this patent application and prior art involving the use of OH functionalized buckminster fullerenes to disperse single walled nanotubes. The prior art functionalization was carried out in a wet chemistry process which works indiscriminately and can damage the lattice structure of the material being functionalized. This invention can be used in either functionalized or non functionalized form. The functionalization can be done in a wet state or a dry powder or solid phase. Solid phase functionalization does not harm the lattice structure of the material being functionalized. Hybrid materials including such as mixtures of carbon nanotubes, graphene, graphene oxide, graphene nanoplatelets, or fullerenes can also be employed as the $1^{st}$ or $2^{nd}$ nanoscale material. Additionally, using the intercalation of metal or non-metals metallic elements, molecules, or compounds with a metal or non-metals compounds where the metal is covalently or ionically bonded together in a molecule, crystal, or ionic crystal with 8 or fewer atoms in solid $C_{60}$ induces metallic or non metallic behavior.

Buckminster fullerenes and planar materials such as graphene, graphene oxide, or graphene nanoplatelets are very different from a chemical point of view. Buckminster fullerenes are spheroidal in shape and thus have non-planar surfaces which affect the flow of electrons, vs. the planar structure of graphene, graphene oxide, or graphene nanoplatelets. Thus graphene materials and buckminster fullerenes have different electronic signatures.

Graphene oxide is functionalized during fabrication as compared with buckminster fullerenes being functionalized post fabrication with oxygen groups. The buckminster fullerenes cited in the prior art of using fullerenes to disperse SWNTs have hydroxyl acid functional groups added through a wet functionalization process. Additionally, graphene oxide actually has a number of functional groups such as oxygen epoxide groups (bridging oxygen atoms), other functional groups found are a combination of: carbonyl (═CO), hydroxyl (—OH), and phenol groups attached to the edges of the individual planar graphene oxide sheets. These functional differences lend themselves to different chemical reactions. Graphene oxide can be reduced to highly conductive graphene by chemical treatment with hydrazine vapors, by annealing in an argon/hydrogen atmosphere at temperatures between 200-400 C, or by other reduction methods. As such, graphene has a remarkably high electron mobility at room temperature. The symmetry of the experimentally measured conductance indicates that the mobilities for holes and electrons should be nearly the same. Electron mobility is nearly independent of temperature between 10K and 100K. The corresponding resistivity of the graphene sheet would be $10^{-6}$ Ω·cm. This is less than the resistivity of silver, the lowest resistivity substance known at room temperature.

Whenever you have distinctly different geometries in nanoscale materials you get significantly different behavior. The electrons move differently and properties such as solubility differ measurably. The electronic properties are different, as are the chemical applications. Mechanical properties imparted to materials differs as well. By practicing this invention a coating can be made by using graphene nanoplatelets which are stacks of thin flat sheets of graphene, using highly functionalized carbon nanotubes in a small quantities to disperse other non functionalized carbon nanotubes in a larger quantity, or else by using semiconducting, metallic, optical, or magnetic elements or derivatives thereof as the surfactant while simultaneously providing a dopant effect. Additionally double walled, thin walled & multi walled nanotubes can also be employed in lieu of single walled nanotubes to produce a highly conductive thin film. Single walled nanotubes have a cobalt catalyst while historically multi walled nanotubes have relied upon a nickel/iron catalyst. A new product called thin walled nanotubes exists and even though they are technically a multi walled product because their diameter is larger than 2 nm, they use a cobalt catalyst which is commonly used to produce single walled nanotubes. However their physical size is 3-5 nm diameter which is 2-4 times larger than the 1.2 nm diameter single walled nanotubes cited. The thin walled nanotubes are MWNTs that have their outer layers removed through extensive purification which makes the outer diameter 3-5 nm. The benefit of this is that research indicates that thin walled carbon nanotubes can be more conductive than single walled carbon nanotubes for coating or printing applications.

For a solid phase dispersion, the above liquid phase can be employed with the additional processing step of solvent evaporation in an oven, rotary evaporator, by heating it on a hot plate at temperatures between 150-225 C. A suitable period of time for this process can be up to 4 hours or thereabouts. Other solvent evaporation methods can be employed. Alternatively the whole process can be run in solid phase, however it may not be desirable to do so due to the risks of the nanoparticles becoming airborne, environmental contamination, or the nanoparticles finding other routes of entry into the human body. The $1^{st}$ nanoparticle in powder form is typically added to a container in the amount desired to be dispersed. This is typically done on a weight basis. The $2^{nd}$ nanoparticle which is functioning as a dispersant, surfactant, or stabilizing molecule in powder form is then added to the container in an amount which is typically 5-125 wt % of the $1^{st}$ nanoparticle for most applications or an amount necessary to suspend the $1^{st}$ nanoparticle in the specific volume of the solvent being used. Furthermore, it may be desirable to add a third material being other nanoscale materials or mixture of these materials to the mixture thus providing a doping effect in the end product. The materials being used as dopants can be conducting, semiconducting, optical, or magnetic. It may be desirable to add forth material being an additional dispersing agent such as polyvinyl pyrrolidone (PVP) sodium dodecyl benzene sulfonate (SDBS), octyl phenol ethoxylate, amino acids or derivatives thereof in quantities substantially less than would typically be employed to disperse the same nanoparticles to the mixture if the second nanoparticle was not present, but it is not necessary. Alternatively, the materials can be added in any order or simultaneously.

The following examples serve to provide the best modes of practice of the present invention and should not be construed as limiting the scope of the invention. These examples include liquid phase dispersions of nanomaterials which can be further processed in the liquid phase or can be dehydrated yielding a powder which has the dispersant, surfactant or stabilizing molecule already added to the nanoparticle being utilized. This material can then be further processed in the solid phase which is desirable for certain applications such as plastics and composite materials. The liquid phase dispersions can be used in concentrated form which is typically a 5 wt % loading of carbon nanotubes or other nano materials. They can also be easily diluted by at least 5 times for further use by adding additional solvent and sonicating or otherwise dispersing the nanomaterials again. If working with resins to produce a masterbatch, concentrations up to 20 wt % are possible. The resulting masterbatch can be let down or diluted for further processing in plastics, polymers, & composite material. The examples also include solid phase dispersions which can then be further processed in the solid phase or rehydrated for processing in the liquid phase.

Determining the solubility of the nanoparticles being used as dispersants, surfactants or stabilizing molecules is a key aspect of this invention. This information allows you to use a solvent and nanoparticle combination to disperse other nanoparticles that are not soluble in the same media. For example, graphene nanoplatelets are soluble in Isopropanol (IPA) or aromatic hydrocarbons. Fullerenes are soluble in toluene, chloronaphthalene, methylaphthalene, dichlorobenzene, trimethylbenzene, tetrahydronaphthalene, carbon disulfide, tribromopropane, xylene, bromoform, cumene, benzene, & cyclohexane. Graphene oxide is soluble in Di water, Dimethylformamide (DMF), N-Methylpyrrolidone (NMP), Isopropanol (IPA), dichlorobenzene, deionized water (DI Water), ethanol, and any other polar solvent that behaves like water. Highly functionalized carbon nanotubes are soluble in Di Water (Di Water), Isopropanol (IPA), Ethanol, Dimethylformamide (DMF), & N-Methylpyrrolidone (NMP). Using this information, it is easy to determine which material to use as a dispersant, surfactant, or stabilizing molecule for the solvent being used. The nanoparticles being used as dispersants, surfactants, or stabilizing molecules can be utilized in functionalized or non functionalized form or else they can be functionalized to promote solubility in the solvent of choice.

Although it is desirable to utilize a nano material providing a dispersant, surfactant or stabilizing molecule action that is soluble in the media being used, as it will form a better suspension of the nano material in the media being used, it is not required. The nanomaterial providing a dispersant, surfactant or stabilizing molecule action is still an effective material to utilize even when materials being used are immiscible (unblendable). It has been found that this invention still works even the nanoscale material being utilized and the nanoparticles being used as dispersants, surfactants, or stabilizing molecules are immiscible (unblendable) in the solvent being used. It is well known that zinc oxide and non functionalized carbon nanotubes are not soluble in Di Water. Research has proven that this combination can be used to suspend carbon nanotubes into Di water, thus gaining the properties of nanoscale zinc oxide for further use. Uses of zinc oxide include an accelerator activator, a pigment and reinforcing agent in rubber, ointments, pigment and mold growth inhibitor in paints, UV absorber in plastics, ceramics, glass, cosmetics, photoconductor, and piezoelectric devices. As such, a dispersion of carbon nanotubes and nanoscale zinc oxide in di water can be applied to the above applications without a typical surfactant being employed which can inhibit use in these applications.

It is desirable to practice this invention in liquid phase to mitigate health and environmental concerns as well as to obtain homogeneity within the sample, alternatively the process can be run in solid phase. By attaching nanoscale allotropes of carbon, elements, or other nanoscale materials providing a dispersant, surfactant or stabilizing molecule action to the deagglomerated nanoparticles to be utilized they can inhibit the Van der Waals forces which make them start to reagglomerate soon after the dispersion process has finished. Agglomerated nanoparticles can lead to pockets or voids in the final product. Agglomerated nanoparticles can cause the loss of the desired properties such as mechanical, optical, kinetic, or conductive properties inherent in the nanoparticles to be utilized. This method will not work if the nanoscale material providing a dispersant, surfactant or stabilizing molecule action is not used in sufficient quantity to allow for dispersion in the media of choice. Research indicates that a minimum value of the nanoscale material providing a dispersants, surfactant, or stabilizing molecule action of at least 5% is needed.

Allotropes or carbon are of particular interest in this invention. The reason for this is because many allotropes of carbon such as graphene, buckminster fullerenes, and carbon nanotubes have very desirable properties such as mechanical toughness, ability to bend without breaking, high electrical conductivity or in some cases superconductivity, & high thermal conductivity. Material such as graphene and carbon nanotubes are hundreds of times stronger than steel on the molecular level but are physically lighter than steel as well. By using those materials in practicing this invention, the nanoscale material providing a dispersant, surfactant, or stabilizing molecule action can actually increase the mechanical or conductive properties of the nanoscale material being utilized when compared to the prior art approach of using the well known surfactants or highly functionalized materials in the same application. Practicing this invention also provides the additional benefit of not having to try to remove the surfactant afterwards. Materials such as graphene oxide are highly soluble in a wide variety of solvents but also non conductive in it's oxide state. However it can be reduced to highly conductive graphene by hydrazine chemical treatment, by annealing in a temperature range of 200-400 C+ with an argon/hydrogen atmosphere, or other methods. By utilizing graphene oxide as detailed in this invention, one can take advantage of the wide range of solvents graphene oxide is soluble in to disperse other nanoscale materials and then reduce it to remove the oxide groups and enhance electrical and thermal conductivity. Other materials such as graphene, graphene nanoplatelets, fullerenes, carbon nanotubes, or hybrid materials thereof can be used if they are soluble or can be functionalized to promote solubility in the desired solvent. An example of this is highly COOH functionalized carbon nanotubes that are soluble in Di Water have been used to disperse non soluble carbon nanotubes, fullerenes, and graphene nanoplatelets in Di water. None of those materials are soluble in water without using surfactants or functionalizing them thus creating defects. While the highly COOH functionalized carbon nanotubes can have some amount of defects present due to their functionality, it can be used in a much lower concentration in its role as a dispersant while the material being dispersed has not been functionalized so it does not have these defects and can perform as expected.

To prepare liquid phase dispersions, the nanoscale material to be utilized is weighed out and added to a container. This amount can vary greatly depending on the specific application. It is typically an amount corresponding to a desired loading ratio determined by the amount of solvent being used and the amount of nano particles desired. Often the loading ratio is 1-5 wt %. It is difficult to add more than 5 wt % of nano particles into a solution when the nano particles are carbon nanotubes or graphenes due to wetability of the materials. The nanoscale material performing a dispersant, surfactant, or stabilizing molecule action as defined in this application is weighed out and added in the desired amount. The nanoparticles being used and the nanoscale material being used as dispersants, surfactants, or stabilizing molecules ratio can be adjusted to provide for minimal dispersant action or by using multiples of the weight percentage of the nanoscale material being utilized to achieve mono dispersed nanoparticles. A solvent is selected from the group of polar or non-polar solvents and is typically an organic or aqueous solvent selected for the desired application of the dispersion being made. A specific volume of the solvent is added to the container having both the nanoscale material to be utilized as well as the nanoscale material performing a dispersant, surfactant, or stabilizing molecule action. It should be noted that these materials can be added in the above order, simultaneously, or one of the materials can be dissolved into the solution then the $2^{nd}$ material can be added. The container is then processed by ultrasonication, high shear mixing, centrifuging and collecting the supernatant liquid, other wet processing methods, or any combination thereof to disperse or deagglomerate the nanoscale material to be utilized and to allow the nanoscale material performing a dispersant, surfactant, or stabilizing molecule action to get in between the individual nanoscale particles being utilized and thus prevent reagglomeration which typically starts soon after the dispersion process has finished. When dispersing via ultrasonication or other methods, mechanical agitation via a magnetic stirrer can also be used. It is desirable to pulse the sonicator on and off repeatedly to avoid shortening the carbon nanotubes or other nano particles. Although the pulse times can vary widely, we typically use 30 seconds on and 30 seconds off. The supernatant liquid is the upper layer of fluid found after a mixture has been centrifuged. Because of its lower density, the fluid and the components in it have a lesser tendency to migrate to the bottom of a centrifuge tube. An additional step of filtering to remove impurities may be employed.

To prepare solid phase dispersions one can choose between following the basic liquid phase process above with the additional processing steps of heating the dispersion to remove the excess solvent and using thermogravimetric analysis to determine the residual solvent content, or else the whole dispersion process in the solid phase. If using the former, the dispersion can be done in liquid phase with ultrasonic waves, centrifugation, homogenizing, shear mixing, or other wet processing methods and then the sample can be dehydrated by baking in an oven, on a hot plate at 125-250 C, by rotor evaporation or other solvent removal methods for several hours to remove the solvent.

If working with highly flammable solvents, it is desirable to evaporate the excess solvent out a lower temperature to prevent combustion of the solvent or vapors. A water or ice bath may also be employed to keep the sample at a low temperature during sonication. The sonic waves create friction within the sample during dispersion. This friction results in the solvent temperature increasing the longer the sonicator is running. Additionally, it is possible to cool the sonic probe via cooling lines inserted into it. For health and safety reasons, it has been found that a longer baking time at a lower temperature such as 125 C is desirable. When the solvent is mostly gone as determined by a visual inspection of the sample, the temperature can be increased to evaporate out the remaining solvent safely. Thermogravimetric analysis is a useful tool to determine the residual solvent content and if enough solvent has been removed.

Alternatively, the material being utilized and the nanoscale material performing a dispersant, surfactant, or stabilizing molecule action can be processed while staying in the solid phase. This can be done by ball, roll, or other milling, high shear or other mixing, mixing of nanoparticles using supercritical CO2, or other dry processing techniques.

The stable dispersion of the present invention may then be added to a secondary reagent to form a polyamide, polyimide, or polyester using classic synthetic pathways. The secondary reagent may be 1,6 Diamino Hexane and the nanoscale carbon particles may be functionalized or non-functionalized. The material can then be further processed by heat pressing the material or other post production processing. However, post production processing may not be necessary for certain applications. This material can then be provided as a very long thread of nanoscale carbon infused polymers, as pellets, as a casting, as a masterbatch, as sheets, or else as a compound. Surfactants can be used to stabilize the dispersed nanoscale carbon but are not necessary for this invention. In addition, the formed polyamide may be processed into a fiber.

DEFINITIONS

1. Carbon nanotubes are comprised of tubular molecules similar to graphite and having a width or diameter from 1-100 nanometers and a length from 0.1 micrometers to 10 millimeters. Carbon nanotubes come in a variety of forms including single walled carbon nanotubes being a single sheet of one atom thick carbon atoms in a tubular shape and having a diameter from 0.8-2 nanometers, double walled carbon nanotubes being two sheets of one atom thick sheets of carbon atoms in a tubular form and having a diameter of 2-4 nanometers, & multi walled carbon nanotubes having multiple concentric sheets of one atom thick carbon atoms in a tubular form and having a diameter from 4-100 nanometers. If the diameter is greater than 100 nanometers and less than 1 micrometer then the product is carbon nano fibers.
2. Carbon nanofibers being physically larger than carbon nanotubes are comprised of sheets of carbon atoms in a tubular form similar to graphite and having a diameter from 100-999 nanometer and a length from 0.1 to 100 micrometers.
3. Buckminster fullerenes are comprised of molecules composed of carbon atoms in the form of a sphere or ellipsoid and have a diameter of approximately 1-2 nanometers. Common fullerenes include C60 and C70 having 60 or 70 carbon atoms respectively, however fullerenes with 72, 76, 84 and even 100 or more carbon atoms are commonly obtained. The naming system for fullerenes goes by the amount of carbon atoms present. Thus a fullerene with 60 carbon atoms is called C60.
4. Graphene is comprised of a two dimensional conductive material in which one atom thick planar sheets of carbon are atoms densely packed in a honeycomb crystal lattice. If there is more than one layer and the layers are attached by Van der Waals or other physical bonds then the material is graphite. Single layer graphene typically has an x and y dimension of 1 nanometer to 100 micrometers and a thickness of approximately 0.7-2 nanometers while few layer graphene can be up to 10 nanometers thick.
5. Graphene oxide is comprised of one atom thick planar sheets having carbon atoms arranged in a layer structure similar to graphite and interlayer spacing approximately two times larger than graphite. Single layer graphene oxide typically has an x and y dimension of 1 nanometer to 100 micrometers and a thickness of approximately 0.7-2 nanometers while few layer graphene oxide can have a thickness up to 10 nanometers. Graphene oxide actually has a number of functional groups such as oxygen epoxide groups (bridging oxygen atoms), other functional groups found are a combination of: carbonyl (=CO), hydroxyl (—OH), and phenol groups attached to the edges of the individual planar graphene oxide sheets.
6. Graphene nanoplatelets are a two dimensional conductive material in which one atom thick planar sheets of carbon atoms having a platelet shape (stacks of thin sheets) are densely packed in a honeycomb crystal lattice. If there is more than one layer and the layers are attached by Van der Waals or other physical bonds then the material is graphite nanoplatelets. Graphene Nanoplatelets typically are arranged in small stacks of graphene sheets that are approximately 1 to 20 nanometers thick with diameters ranging from sub-micrometer to 100 micrometers.
7. Graphone is a carbon based magnetic material in which carbon 1 atoms are hydrogenated and the carbon 2 atoms bonds remain saturated having hydrogen atoms adsorbed on carbon 1 atoms with carbon-hydrogen bonds arranged normal to graphene.
8. Graphane is an insulating material having carbon to carbon bonds connecting carbon atoms with hydrogen at opposite sides of the plane.
9. Nanowhiskers are also known as nanorods and are metals or semiconducting materials having all of their physical dimensions in the range from 1-100 nanometers.
10. Nanobuds are comprised of carbon nanotubes and spheroidal fullerenes wherein the fullerenes are covalently bonded to the outer sidewalls of the underlying nanotube.
11. A nanotorus is comprised of carbon nanotubes bent into a torus or doughnut shape.
12. Nano onions are comprised of spherical particles based on multiple carbon layers surrounding a buckminsterfullerene core.
13. Nanoscale elements are comprised of a chemical elements listed on the periodic table or derivatives thereof having at least one of their physical properties on the nanoscale with a dimension of 1-100 nanometers.
14. Nanoscale oxides are comprised of nanoscale elements in the oxidation state of −2 or a chemical compound formally containing an oxygen in this state and having at least one of their physical properties on the nanoscale with a dimension of 1-100 nanometers.

15. A nanoscale nitride is comprised of a compound of nitrogen where nitrogen has a formal oxidative state of −3 and having at least one of their physical properties on the nanoscale with a dimension of 1-100 nanometers. Nitrides are a large class of compounds with a wide range of properties and applications. Stabile aqueous dispersions of nitrides do exist including silicon nitride, Carbon hydride, hydrogen cynaide, akalai solutiona, boron nitride.
16. A nanoscale metal is a chemical element that is a good conductor of both electricity and heat and forms cations and ionic bonds with non-metals and having at least one of their physical properties on the nanoscale with a dimension of 1-100 nanometers.
17. Nanowires are metallic, semiconducting, or insulating structures that have a thickness or diameter constrained to tens of nanometers or less and an unconstrained length.
18. Nanopeapods are interstellar molecules such as buckminster fullerenes encapsulated in carbon nanotubes.
19. Nano lanthanides are the fifteen elements with atomic numbers 57 through 71 from lanthanum to lutetium and having at least one of their physical properties on the nanoscale with a dimension of 1-100 nanometers.
20. Graphite is an allotrope of carbon in any form including amorphous, crystalline, lump, or highly ordered pyrolitic form.
21. Nanopopcorn are gold nanoparticle that look like kernels of popcorn for use in biomedical applications.
22. Boron nanotubes are tubular molecules made from boron or boron derivatives and having a width or diameter from 1-100 nanometers and a length from 0.1 micrometers to 10 millimeters.
23. Other nanotube species are tubular molecules made from elements other than carbon and having a width or diameter from 1-100 nanometers and a length from 0.1 micrometers to 10 millimeters.
24. Clay nanotubes—is comprised of tubular molecules made from Halloysite or other clay materials and having a width or diameter from 1-100 nanometers and a length from 0.1 micrometers to 10 millimeters.
25. Nanobeads are spheroidal shaped beads of an element, polymer, or composite material with a diameter from 1-1000 nanometers.
26. Dispersant is a dispersant or a dispersing agent, a plasticizer, or a super plasticizer that is either a non-surface active polymer or a surface-active substance added to a suspension, usually a colloid, to improve the separation of particles and to prevent settling or clumping. Dispersants are normally made up of one or more surfactants but may also be gases.
27. Surfactants are amphiphilic substances that can absorb on interfaces and lower the surface or interfacial tension.
28. Stabilizing molecules are molecule that function to stabilize nanoparticles in suspension or dispersions and can be chemically or physically bound to the nanoparticles being stabilized, thereby eliminating the problems that occur due to lack of solubility, reagglomeration, migration, or volatility.
29. A particle is a small object that behaves as a whole unit in terms of its transport and properties. Particles are further classified according to size: in terms of diameter, fine particles cover a range between 100 and 2500 nanometers. Ultrafine particles are typically sized between 1 and 100 nanometers. Similar to ultrafine particles, nanoparticles are sized between 1 and 100 nanometers. Although the size of most molecules would fit into the above outline, individual molecules are usually not referred to as nanoparticles.
30. Nanoclusters have at least one dimension with the narrow size distribution between 1 and 10 nanometers.
31. Nanopowders are agglomerates of ultrafine particles, nanoparticles, or nanoclusters. Nanometer-sized single crystals, or single-domain ultrafine particles, are often referred to as nanocrystals.
32. Nanocrystal is any nano material with at least one dimension ≤100 nm and that is single crystalline being a solid material whose constituent atoms, molecules, or ions are arranged in an orderly repeating pattern extending in all three spatial dimensions.
32. A nanoscale molecule is an electrically neutral group of at least two atoms held together by covalent chemical bonds and having a physical size from 1-100 nanometers. Molecules are distinguished from ions by their electrical charge.
34. Functionalized means adding functional groups to a nanoscale allotrope of carbon or other element thus promoting solubility in certain solvents.
35. A dispersion is a system in which particles are dispersed in a continuous phase of a different composition or state. Dispersions are typically stable for at least a week and can be stable for many months.
36. A suspensions is a heterogeneous fluid containing solid particles that are sufficiently large for sedimentation. Usually they must be larger than 1 micrometer. The internal phase (solid) is dispersed throughout the external phase (fluid) through mechanical agitation with the use of certain excipients or suspending agents. Unlike colloids, suspensions will eventually settle. Suspensions are typically stable for at least a week and can be stable for many months.
37. An emulsion is a mixture of two or more immiscible (unblendable) liquids. Emulsions are part of a more general class of two-phase systems of matter called colloids. Although the terms colloid and emulsion are sometimes used interchangeably, emulsion tends to imply that both the dispersed and the continuous phase are liquid. In an emulsion, one liquid (the dispersed phase) is dispersed in the other (the continuous phase).
38. Nanoscale graphite is a material with at least one dimension being nanoscale and having carbon atoms arranged in a layered or planar structure. In each layer, the carbon atoms are arranged in a hexagonal lattice. If there are multiple layers and the layers are attached by Van der Waals or other physical bonds then the material is graphite, not graphene.
39. Graphite nanoplatelets is a material being in platelet form (stacks of thin flat sheets) with at least one dimension being nanoscale, usually thickness, and having carbon atoms arranged in a layered or planar structure. In each layer, the carbon atoms are arranged in a hexagonal lattice. If there are multiple layers and the layers are attached by Van der Waals or other physical bonds then the material is graphite, not graphene.
40. A solution is a homogeneous mixture composed of at least two substances in liquid form.
41. Buckypaper is a thin sheet made from an aggregate of carbon nanotubes. The generally accepted methods of making buckypaper involves the use of non-ionic surfactants which improves their dispersibility in aqueous solution. These suspensions can then be membrane filtered under positive or negative pressure to yield uniform films thus making buckypaper. An alternative method involves using frit compression.

42. Graphene oxide paper is a composite material fabricated from graphite oxide. The material has exceptional stiffness and strength, due to the intrinsic strength of the two-dimensional graphene backbone and to its interwoven layer structure which distributes loads. The starting material is water-dispersed graphene oxide flakes, which typically contain a single graphene layer. These suspensions can then be membrane filtered under positive or negative pressure to yield uniform films thus making buckypaper. An alternative method involves using frit compression. Like the starting material, graphene oxide paper is an electrical insulator; however, it may be possible to tune this property, making the paper a conductor or semiconductor, without sacrificing its mechanical properties.

The following examples serve to illustrate some of the best modes of practice of the present invention. Many other applications of this technology can be easily envisioned and the examples below should not be construed as limiting the scope of the invention.

EXAMPLE 1

In this embodiment, Single Layer Graphene Oxide (SLGO) is used to disperse Multi Walled Carbon Nanotubes (MWNTs) in N-Methylpyrrolidone (NMP). MWNTs (200 mgs) are combined with 25-50 mgs of silver nanowires and are dispersed into 250-500 mls NMP with SLGO being used as a surfactant in the range from 5-125 wt % of the MWNTs producing a solution that is stable for at least one week.

This solution can then be employed as a conductive ink which is typically comprised of a colloidal suspension of nanometer-sized metal and other particles coated with a thin stabilizer (surfactant) shell. The resulting ink can then be deposited by ink jet printing, screen printing, meyer rod, draw bar, other printing methods, spin coating, dip coating, drop casting, or other sol-gel methods. By practicing this invention, it is possible to achieve similar or higher conductivity using less of the silver nanowires or MWNTs thus gaining a significant cost savings. It is also possible to use other, more environmentally friendly solvents such as Di Water. Alternatively, graphene, graphene nanoplatelets, fullerenes, carbon nanotubes or other highly conductive nano materials, as detailed in this patent application, can be utilized as the surfactant or stabilizing molecule with different solvents.

After deposition, it is desirable to reduce the SLGO to neat graphene by chemical treatment, by annealing it at a temperature of 200-400 C in an argon & hydrogen atmosphere, or by other reduction methods to gain the benefit of having the dispersant, surfactant, or stabilizing molecule become electrically conductive and to increase the overall conductivity of the nano ink. It should be noted that although SLGO was used in this example, other non oxide, conductive materials can be used as the dispersant in other solvents. For example, graphene nanoplatelets can be used successfully with isopropanol or aromatic hydrocarbons. Fullerenes can be used with toluene or other solvents. If using the latter examples, the SLGO reduction process is not necessary.

Generally, after a nano-ink has been printed onto a substrate, it is thermally cured at temperatures above 100 C and upon solvent evaporation, forms a continuous conductive thin film comprising the printed feature. Thermal curing is a necessary step in establishing electrical contact in the feature, since the ink is essentially an insulator in its as-dried state. Raising the temperature above that required for solvent evaporation initiates polymer flow, allowing the stabilizer shell to move away from the interparticle regions, thus establishing contact between metal particles. However with this invention, the now reduced surfactant, or the latter examples above are highly conductive themselves, this enhances conductivity between nanoparticles in the host matrix. As the temperature is raised above 100 C, the conductivity increases and the film becomes more mechanically robust.

COMPARATIVE EXAMPLE 1

In this embodiment, Poly Vinyl Pyrrolidone (PVP) or other surfactants are used to disperse Multi Walled Carbon Nanotubes (MWNTs) in N-Methylpyrrolidone (NMP). MWNTs (200 mgs) are combined with 25-50 mgs of silver nanowires and dispersed into 250-500 mls NMP with PVP being used as a surfactant in the range from 20-125 wt % of the MWNTs producing a solution that is stable for at least one week. This solution can then be employed as a conductive ink. The PVP can't be removed as it is a polymer and coats everything else in the solution including the MWNTs and silver nanowires thus reducing their conductivity. Since PVP is not as conductive as the reduced graphene oxide or other surfactants, as detailed in example 1, it thus inhibits the conductivity of the final product or requires higher amounts of the conductive materials to be used which is not a cost effective solution. The PVP polymer coats all of the nanoparticles and thus decreases the overall conductivity of the materials being used. As a result, more materials must be put into the dispersion to achieve the desired conductivity which increases the production costs.

To prevent loss of conductivity, the surfactant will have to be removed if possible. It should be noted that the Van der Waals force's interaction between the nanotube surface and the surfactant can often be mechanically strong and quite stable and therefore there are no assurances that all the surfactant is removed from the material. The resulting suspension can then be used for ink jet printing, screen printing, meyer rod, draw bar, or other printing methods, spin coating, dip coating, drop casting, or other sol-gel methods.

EXAMPLE 2

In this embodiment, Single Layer Graphene Oxide (SLGO) is used to disperse a conductive nanoscale material (100 mgs) such as SWNTs, DWNTs, TWNTs, or MWNTs, fullerenes, graphene, graphene nanoplatelets, or other conductive nano materials in 500 mls of Dimethylformamide (DMF), N-Methylpyrrolidone (NMP), Isopropanol (IPA), dichlorobenzene, or deionized water (DI Water) for transparent conductive coating applications. The conductive second nanomaterial is dispersed into 500 mls Di water with SLGO being used as a surfactant in the range from 50-500 wt % of the SWNTs. For transparent conductive coating applications, it is often desirable to use more of the material providing a dispersant, surfactant, or stabilizing action to keep the conductive nanomaterials well separated in the coating. The solvent being used will often dictate which material should be used for the second nanoscale materials providing a dispersant, surfactant, or stabilizing molecule action. For example, if working with DI Water, single or few layer graphene oxide, water soluble carbon nanotubes, or water soluble fullerenes are desirable. If working with Isopropanol, graphene nanoplatelets are a good choice. Graphene oxide is can also be employed is working with N-Methypyrrolidone or Dimethylformanide.

It is desirable to use SWNTs, graphene, or fullerenes as the first nanoscale material being used due to their high conductivity and small diameter of 1-2 nm which allows for a tighter packing density in the resulting film. However small diameter MWNTs, DWNTs, Fullerenes, Graphene Nanoplatelets can also be used in lieu of SWNTs or fullerenes if desired. This dispersion can then be used to make a transparent conductive coating by inkjet printing, screen printing, meyer rod, draw bar, or other printing methods, spin coating, dip coating, drop casting, or other sol-gel methods. If using SLGO as the dispersant, it is desirable to reduce the graphene oxide to graphene by chemical treatment, annealing it in a temperature range of 200-400 C in an argon and hydrogen atmosphere, or other reduction methods to gain the benefit of having the dispersant become electrically & thermally conductive.

It may be desirable to incorporate other nanoscale elements in powder form to the mixture prior to dispersion to introduce a doping effect to the film. The property of semiconductors that makes them most useful for constructing electronic devices is that their conductivity may easily be modified by introducing impurities into their crystal lattice structure. The process of adding controlled impurities to a semiconductor is known as doping. The amount of impurity, or dopant, added to an intrinsic (pure) semiconductor varies its level of conductivity. Doped semiconductors are often referred to as extrinsic.

By adding the impurity to films of pure semiconductors, the electrical conductivity may be varied not only by the number of impurity atoms but also, by the type of impurity atom and the changes may be thousand folds and million folds. The same doping effect can be realized with magnetic particles such as nickel, iron, neodymium, or any combination thereof to the mixture of nanoparticles before the dispersion process. The resulting suspension can have magnetic properties as well as conductive properties which are desirable for electronics applications, particularly in memory or data storage. An additional benefit to practicing this invention is not having to try to remove the surfactant from the film after coating which interferes with the conductive and magnetic properties. Alternatively, elements having optical properties can be used.

COMPARATIVE EXAMPLE 2

In this embodiment, poly vinyl pyrrolidone (PVP), sodium dodecyl benzene sulfonate (SDBS), or other surfactants are used to disperse carbon nanotubes (CNTs) in Dimethylformamide (DMF). It is desirable to use SWNTs (100 mgs) due to their small diameter of 1-2 nm, however small diameter multi walled nanotubes (MWNTs), thin walled nanotubes (TWNTs), Graphene, Fullerenes, or other nanoscale conductive materials can all be used in lieu of SWNTs if desired. The CNTs are dispersed into 500 mls Di water with PVP being used as a surfactant in the range from 50-500 wt % of the SWNTs. For transparent conductive coating applications, it is often desirable to use more of the material providing a dispersant, surfactant, or stabilizing action to keep the materials well dispersed in the coating. This dispersion can then be used to make a transparent conductive coating by inkjet printing, screen printing, meyer rod, draw bar, or other printing methods, spin coating, dip coating, drop casting, or other sol-gel methods.

Because the PVP or SDBS surfactant will inhibit conductivity in the resulting film, it needs to be removed if possible. This is typically done by repeatedly washing and rinsing in an attempt to remove the PVP or SDBS surfactant from the film. Some amount of the surfactant typically becomes trapped inside the film and will interfere with the conductive properties of the film. Although the doping effect can also be used in this fashion, because the surfactants inhibit conductivity one must use use more of the impurities being doped into the film to achieve a similar or less result thus increasing the cost of the final product.

It should be noted that the Van der Waals force's interaction between the nanotube surface and the surfactant can often be mechanically strong and quite stable and therefore there are no assurances that all the surfactant is removed from the CNT film after formation. Washing with methanol, an effective solvent in the surfactant removal was found to cause cracking and deformation of the film.

EXAMPLE 3

In this embodiment, Graphene Nanoplatelets (GNPs) is used to disperse multi walled carbon nanotubes (MWNTs) in Isopropanol (IPA). The GNPs are soluble in IPA and the MWNTs are not. One gram of MWNTs was dispersed into 100 mls IPA with GNPs being used as a surfactant in the range from 5-125 wt % of the MWNTs. This dispersion can then be dehydrated by baking it at 225 C for 4 hours to completely remove the solvent and the resulting dry powder can be further processed in a solid state which is desirable for plastics and composite applications. Additionally, the dehydrated powder can now function as a hybrid material of MWNTs with a surfactant already added to them. This presents a novel method to add surfactants to carbon nanotubes prior to use in plastics, polymers, composite materials many other applications in which the additive materials must be in solid form.

COMPARATIVE EXAMPLE 3

In this embodiment, poly vinyl pyrrolidone (PVP), sodium dodecyl benzene sulfonate (SDBS), or other surfactants are used to disperse carbon nanotubes in Isopropanol (IPA). One gram of MWNTs was dispersed into 100 mls IPA with SDBS or other surfactants being used in the range of 5-125 wt % of the MWNTs as a dispersant. This dispersion can then be dehydrated by baking it to remove the solvents and can be further processed in a solid state which is desirable for plastics, polymer, and composite applications. It is not always possible to remove the SDBS dispersant in this application and it often leads to a lot of clumping or aggregation of the nanoscale material being utilized. This is a strongly negative factor since the aggregates will not be effectively deagglomerated when being processed in an extruder, braybend mixer, melt processor, or other plastics, polymer, or composite material processes. The clumping and aggregation is especially pronounced when working with water as the solvent and PVP as the dispersant.

It should be noted that the Van der Waals force's interaction between the nanotube surface and the surfactant can often be mechanically strong and quite stable and therefore there are no assurances that all the surfactant is removed from material after formation.

EXAMPLE 4

In this embodiment, Graphene is used to disperse Single Walled Carbon Nanotubes (SWNTs), Double Walled Nanotubes (DWNTs), Thin Walled Nanotubes (TWNTs) Multi Walled Nanotubes (MWNTs), Graphene, or graphene nanoplatelets in Isopropanol (IPA) for use in making optical films. Graphene is soluble in IPA and thus presents an excellent media for practicing this invention with CNTs, graphenes, graphene nanoplatelets, or other conductive nanomaterials. For this example SWNTS (100 mgs) are dispersed into 200 mls of IPA with C60 99 wt % being used as a surfactant in the range from 5-500 wt % of the SWNTs as a surfactant. For certain coating applications, it is often desirable to use more of the material providing a dispersant, surfactant, or stabilizing action to keep the materials well dispersed in the coating. This dispersion can then be further processed into a film by ink jet printing, screen printing, meyer rod, draw bar, other printing methods, spin coating, dip coating, drop casting, sol-gel or other deposition methods having the added benefit of having a dispersant that is both mechanically tough and electrically conductive. It may also be desirable to incorporate other nanoscale elements such as oxides, nitrides, metals, magnetic elements, optical materials, or other nanoparticles as described in example 2 to introduce a doping effect to the film.

Since graphene is highly conductive and mechanically tough, films produced with them are often both highly conductive and mechanically robust as well. These films will also be more resistant to scratching or cracking due to the mechanical properties gained by using graphene as the dispersant. Another significant benefit is realized by not having to try to remove the surfactant from the film which is often unsuccessful.

An area of particular interest is adding materials such as silicon dioxide, Yttria, Zinc, silver, or other nanoscale optical coating materials to make a film with optical properties which can then be stacked creating anti reflective or optical interference films. These films can be used to increase light transmission in certain spectral regions, to block light transmission in certain regions, or a combination of increasing transmission in some regions while simultaneously blocking transmission in other spectral regions.

COMPARATIVE EXAMPLE 4

In this embodiment, poly vinyl pyrrolidone (PVP), sodium dodecyl benzene sulfonate (SDBS), or other surfactants are used to disperse Single Walled Carbon Nanotubes (SWNTs) in Di Water. SWNTs (100 mgs) was dispersed in 200 mls of toluene with PVP or other surfactants being used as a surfactant in the range from 50-500 wt % of the SWNTs. This dispersion can then be further processed into a film by inkjet, screen printing, meyer rod, draw bar, or other printing methods, spin coating, dip coating, drop casting, or other sol-gel methods. This film will have to be repeatedly washed and rinsed and some amount of the surfactant is typically trapped inside the film and can interfere with the conductivity of the film. It should be noted that the Van der Waals force's interaction between the nanotube surface and the surfactant can often be mechanically strong and quite stable and therefore there are no assurances that all the surfactant is removed from the CNT film after formation. Washing with methanol, an effective solvent in the surfactant removal was found to cause cracking and deformation of the film.

EXAMPLE 5

In this embodiment, nanoscale Yttria (100 mg) is dispersed into 1 Liter of Dimethylformamide (DMF) or Di Water solvents using Single Layer Graphene Oxide (SLGO) in the range of 5-500 wt % of the Yttria as the surfactant. The resulting solution can then be utilized for optical layers by spin coating, dip coating, drop casting, solgel deposition, inkjet printing, meyer rod printing, draw bar printing, or other printing or deposition methods. This is of particular interest, because creating suspensions of well known optical materials such as yttria, zinc, silver, or other optical coating materials is desirable to produce films with optical properties which can stacked creating antireflective or optical interference films. SLGO is well suited to this application being soluble in a wide variety of solvents such as Di Water, IPA, NMP, DMF, DCB and others. Also, since the film is tailored for its optical properties and conductivity isn't as important, SLGO becomes a desirable material to use as the dispersant. It can be used with great benefit to suspend the nanoscale optical materials for use in making the optical films. These films can be used to increase light transmission in certain spectral regions, to block light transmission in certain regions, or a combination of increasing transmission in some regions while simultaneously blocking transmission in other spectral regions.

COMPARATIVE EXAMPLE 5

In this embodiment, Yttria (100 mg) was dispersed into 1 liter of Dimethylformamide (DMF) or Di Water solvents using PVP, SDBS, or other surfactants in the range of 5-500 wt % of the Yttria as the surfactant. The resulting solution can then be utilized for optical layers by spin coating, dip coating, drop casting, solgel deposition, inkjet printing, meyer rod printing, draw bar printing, or other printing or deposition methods. However the presence of the PVP, SDBS, or other surfactants will interfere with the optical properties of the films and likely can't be removed from the film by washing and rinsing. Particularly when stacking layers as is normal for anti reflection or optical interference coatings as each layer would have to be washed and rinsed prior to deposition of the subsequent layers.

It should be noted that the Van der Waals force's interaction between the nanotube surface and the surfactant can often be mechanically strong and quite stable and therefore there are no assurances that all the surfactant is removed from the CNT film after formation. Washing with methanol, an effective solvent in the removal of polyethylene glycol, was found to cause cracking and deformation of the film. It has also been found that polyethylene glycol can lead to cell lysis and in turn tissue inflammatory responses even at low concentrations.

EXAMPLE 6

In this embodiment, Graphene Nanoplatelets (GNPs) are used to disperse multi walled carbon nanotubes (MWNTs) or single walled nanotubes (SWNTs) in Isopropanol (IPA). MWNTs (100 mgs) was dispersed into 500 mls IPA with GNPs being used as a surfactant in the range from 5-125 wt % of the MWNTs. These suspensions can then be membrane filtered or frit compressed to yield uniform films called buckypaper. In either method, it is possible to magnetically align the carbon nanotubes by performing the paper fabrication process in a strong magnetic field.

Membrane filtration under positive or negative pressure yields uniform films which when dried and removed from the membrane are known as buckypaper if comprised of carbon nanotubes. To perform membrane filtration, the CNTs solution is placed over a membrane with a fine pore size typically 0.2 micrometers. The solution is added to the top of the apparatus holding the membrane and a vacuum is pulled from a side port below. Alternatively, air or other high pressure gasses, preferably inert, are feed into the apparatus from above. The CNTs remain on top of the membrane while the IPA from the dispersion flows through the membrane and is collected as waste or recycled. The air or vacuum force used exerts pressure on the CNTs mixed with the GNPs which causes the materials to pack together in a dense, paper like material which can be removed from the membrane when it has dried. Typically the membranes will dissolve in certain solvents such as acetone. The free standing bucky paper can then be removed and dried for further use.

Frit compression is where a suspension of carbon nanotubes is squeezed between two polypropylene frits typically with a 70 micrometer pore diameter inside a syringe column. The pore structure of the frit allows a rapid exit of the solvent leaving the carbon nanotubes to be pressed together. The presence of the solvent controls the interaction between the tubes allowing the formation of tube-tube junctions; its surface tension directly affects the overlap of adjoining nanotubes thus gaining control over the porosity and pore diameter distribution of buckypaper.

It may also be desirable to add $FE^3O^4$ and/or Ni, or other magnetic materials to the mixture prior to dispersion to create a conductive buckypaper with magnetic properties. Since graphene oxide or clay nanotubes are insulators in their native state. They can be used to make an electrically insulating yet mechanically strong graphene oxide paper or buckypaper. Any of the above layers can have other nanoscale elements doped into them if desired. For instance a insulating bottom layer, a highly conductive middle layer, and a conductive and or magnetic top layer. Any combination of the suspensions described above can be used together to create a buckypaper with an arrangement of positive and negative layers which can function as an opto-electronic device. Additionally the arrangement and type of the layers can vary depending on the specific device being made.

Buckypaper-based photoelectric conversion devices could be conveniently fabricated on a large scale and at low cost, and they also could be tailored at ease. Additionally, the flexibility of the buckypapers favors the flexible fabrication of these devices. Other applications of buckypaper include dissipating lightening strikes on aircraft and other vessels, blocking electromagnetic and radio frequency interference, ballistic materials, next generation electronics and displays, composite materials, and many more.

COMPARATIVE EXAMPLE 6

Poly vinyl pyrrolidone (PVP), sodium dodecyl benzene sulfonate (SDBS), or other surfactants are used to disperse multi walled carbon nanotubes (MWNTs) or single walled nanotubes (SWNTs) in Isopropanol (IPA). MWNTs (200 mgs) was dispersed into 500 mls IPA with SDBS being used as a surfactant in the range from 5-125 wt % of the MWNTs. These suspensions can then be membrane filtered under positive or negative pressure or else frit compressed to yield uniform films called buckypaper. In either method, it is possible to magnetically align the carbon nanotubes by performing the paper fabrication process in a strong magnetic field.

Membrane typically filtration involves the use of non-ionic surfactants, such as polyethylene glycol and sodium lauryl sulfate to improve the CNTs dispersibility in aqueous solution. Frit compression is possible without using surfactants. However, by practicing this invention the surfactant itself can provide increased mechanical properties where the above surfactants can not. It should be noted that the Van der Waals force's interaction between the nanotube surface and the surfactant can often be mechanically strong and quite stable and therefore there are no assurances that all the surfactant is removed from the CNT film after formation. Washing with methanol, an effective solvent in the removal of octyl phenol ethoxylate, was found to cause cracking and deformation of the film.

The present invention details novel dispersions of nanomaterials. These dispersions can then be further processed into a wide variety of products including but not limited to composite materials, polymers, resins, epoxies, emulsions, cements, coatings, clays, films, membranes, paper, fibers, inks, paints, pastes, electronics, spintronics, optical coatings, biotechnology materials, electrodes, field emission or other displays, plating, capacitors, ceramics, catalysts, clays, ballistic materials, drug delivery, doped coatings, magnetics, dielectrics, barrier layers, selective ion flow membranes, batteries, fuel cells, solar and other applications. The invention can also be used to protect electronics from electromagnetic interference, radio frequency interference or radio frequency identification. There are many more possible ways to practice this invention which have not been covered herein.

| References Cited [Referenced By] | | |
|---|---|---|
| 11/562,450 | Nov. 22, 2006 | Kim et al. |
| 10/585,094 | Dec. 24, 2004 | Penicaud et al. |
| 12/346,801 | Dec. 30, 2008 | Yang et al. |
| 12/062,613 | Apr. 4, 2008 | Shin et al. |
| 11/562,450 | Nov. 22, 2006 | Kim et al. |
| 10/342,257 | Jan. 15, 2003 | Kuper et al. |
| 10/263,375 | Oct. 1, 2002 | Bolskar et al. |
| 11/904,247 | Sep. 25, 2007 | Veedu |
| 09/932,986 | Aug. 21, 2001 | Clarke et al. |
| 11/615,316 | Dec. 22, 2006 | Moorlag et al. |
| 10/897,088 | Jul. 23, 2004 | Gotou |
| 10/590,809 | Nov. 16, 2004 | Sakakibara et al. |
| 12/597,844 | Apr. 24, 2008 | Kitano. |

OTHER REFERENCES

Krstic et al . . . , Langmuir-Blodgett Films of Matrix-Diluted Single-Walled Carbon Nanotubes. Chem. Mater., vol. 10, pp. 2338-2340, 1998.

A. C. Rinzler, et al.; "Large-scale purification of single-wall carbon nanotubes: process, product, and characterization" Applied Physics A 67, 117 (1998) pp. 29-37.

G. S. Duesberg, et al; "Rapid Communications; Chromatographic size separation of single-wall carbon nanotubes"; Applied Physics A; (1998) pp. 117-119.

Jie Liu et al.; "Fullerene Pipes"; Science vol. 280; (May 22, 1998); pp. 1253-1256.

Konstantin B. Shelimov, et al.; "Purification of single-wall carbon nanotubes by ultrasonically assisted filtration"; Chemical Physics Letters 282; (1998) pp. 429-434.

Kevin D. Ausman et al. Organic Solvent Dispersions of Single-Walled Carbon Nanotubes: Toward Solutions of pristine Nanotubes. Jul. 19, 2000 J. Phys. Chem. American Chemical Society.

Furtado et al. in "Debundling and Dissolution of Single-Walled Carbon Nanotubes in Amide Solvents", J. Am. Chem. Soc., 2004, v. 126, pp. 6095-6105, published on Web Apr. 24, 2004.

Wise et al. "Stable dispersion of single wall carbon nanotubes in polyimide: the role of noncovalent interactions", Chemical Physics Letters, 2004, v. 391, pp. 207-211.

Kim et al. "Individualization of Single-Walled Carbon Nanotubes: Is the Solvent Important?", Small, 2005, v. 1, No. 11, pp. 1117-1124.

Hasan et al. "Dispersibility and stability improvement of unfunctionalized nanotubes in amide solvents by polymer wrapping", Physica E, 2008, v. 40, pp. 2414-2418.

Ganter et al. "Variation of single wall carbon nanotube dispersion properties with alkyl amide and halogenated aromatic solvents", Materials Chemistry and Physics, 2009, v. 116, pp. 235-241.

Landi et al. "Effects of Alkyl Amide Solvents on the Dispersion of Single-Wall Carbon Nanotubes", J. Phys. Chem. B 2004, v. 108, pp. 17089-17095.

Ausman et al., "Organic Solvent Dispersions of Single-Walled Carbon Nanotubes: Toward Solutions of Pristine Nanotubes," J. Phys. Chem. B 104(38):8911-8915 (2000).

Bahr et al., "Dissolution of Small Diameter Single-Wall Carbon Nanotubes in Organic Solvents?" Chem. Commun. 2:193-194 (2001).

Chattopadhyay et al., "A Route for Bulk Separation of Semiconducting from Metallic Single-Wall Carbon Nanotubes," JACS 125:3370-3375 (2003).

Chen et al., "Dissolution of Full-Length Single-Walled Carbon Nanotubes," J. Phys. Chem. B 105:2525-2528 (2001).

Chen et al., "Solution Properties of Single-Walled Carbon Nanotubes," Science 282:95-98 (1998).

Dai, "Carbon Nanotubes: Opportunities and Challenges," Surface Sci. 500:218-241 (2002).

Kahn et al., "Solubilization of Oxidized Single-Walled Carbon Nanotubes in Organic and Aqueous Solvents through Organic Derivatization," Nano Lett. 2(11):1215-1218 (2002).

Krupke et al., "Near-Infrared Absorbance of Single-Walled Carbon Nanotubes Dispersed in Dimethylformamide," J. Phys. Chem. B 107(24):5667-5669 (2003).

Landi et al., "Effects of Alkyl Amide Solvents on the Dispersion of Single-Wall Carbon Nanotubes," J. Phys. Chem. B 108:17089-17095 (2004).

Matarredona et al., "Dispersion of Single-Walled Carbon Nanotubes in Aqueous Solutions of the Anionic Surfactant NaDDBS," J. Phys. Chem. B 107:13357-13367 (2003).

Niyogi et al., "Ultrasonic Dispersions of Single-Walled Carbon Nanotubes," J. Phys. Chem. B 107:8799-8804 (2003).

O'Connell et al., "Reversible Water-Solubilization of Single-Walled Carbon Nanotubes by Polymer Wrapping," Chem. Phys. Lett. 342:265-271 (2001).

What is claimed:

1. A method of forming a stable dispersion of at least one first nanoscale material with a dispersant, surfactant, or stabilizing molecule consisting of a second nanoscale material, said method consisting of the steps of:
    a) blending said first nanoscale material, said second nanoscale material, and a solvent to form a blend, said second nanoscale material being present in said blend in an amount from 5 wt. % to 500 wt. % of a total amount of the first nanoscale material present in the blend; and
    b) processing said blend so as to deagglomerate and disperse the first nanoscale material as well as the second nanoscale material in said blend to form a stable dispersion in which 100% of the first nanoscale material dispersed in said stable dispersion remains in suspension for at least 24 hours and at least 70% of the first nanoscale material dispersed in said stable dispersion remains in suspension for at least one week;
    wherein said first nanoscale material is not functionalized and is at least one member selected from the group consisting of single-walled carbon nanotubes, thin-walled carbon nanotubes, double-walled carbon nanotubes and multi-walled carbon nanotubes;
    wherein said second nanoscale material is selected from the group consisting of graphene, graphene oxide and graphene nanoplatelets;
    wherein said blend includes no other dispersant, no other surfactant, and no other stabilizing molecule besides said second nanoscale material.

2. The method according to claim 1, wherein said first nanoscale material is present in the blend in an amount of 0.01 to 5 weight percent.

3. The method according to claim 2, wherein said second nanoscale material is present in the blend in an amount of 5 to 125 weight percent of said first nanoscale material.

4. The method according to claim 1, wherein said solvent is an organic solvent.

5. The method according to claim 1, wherein said solvent is deionized water.

6. The method according to claim 1, wherein said blend is processed by ultrasonication to form said stable dispersion.

7. A method of forming a stable dispersion of at least one first nanoscale material with a dispersant, surfactant, or stabilizing molecule consisting of a second nanoscale material, said method consisting of the steps of:
    a) blending said first nanoscale material, said second nanoscale material, and a solvent to form a blend, said second nanoscale material being present in said blend in an amount from 5 wt. % to 500 wt. % of a total amount of the first nanoscale material in said blend;
    b) processing said blend by ultrasonication so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week; and
    c) processing said stable dispersion further to form buckypaper;
    wherein said first nanoscale material is a mixture of graphene nanoplatelets and carbon nanotubes, said carbon nanotubes are not functionalized, said second nanoscale material is graphene oxide, and said solvent is an organic solvent or deionized water and
    wherein said blend includes no other dispersant, no other surfactant, and no other stabilizing molecule besides said second nanoscale material.

8. The method according to claim 7, wherein said stable dispersion is coated, frit compressed or membrane filtered under positive or negative pressure to yield said buckypaper.

9. A method of forming a stable dispersion of at least one first nanoscale material with a dispersant, surfactant, or stabilizing molecule consisting of a second nanoscale material, said method consisting of the steps of:
    a) blending said first nanoscale material, said second nanoscale material, a magnetic material added as a dopant, and a solvent to form a blend, said second nanoscale material being present in said blend in an amount from 5 wt. % to 500 wt. % of a total amount of the first nanoscale material present in the blend; and b) processing said blend so as to deagglomerate and disperse the first nanoscale material as well as the second nanoscale material in said blend to form a stable dispersion in which 100% of the first nanoscale material dispersed in said stable dispersion remains in suspension for at least 24 hours and at least 70% of the first nanoscale material dispersed in said stable dispersion remains in suspension for at least one week;

wherein said first nanoscale material is not functionalized and is at least one member selected from the group consisting of single-walled carbon nanotubes thin-walled carbon nanotubes, double-walled carbon nanotubes and multi-walled carbon nanotubes;

wherein said second nanoscale material is selected from the group consisting of graphene, graphene oxide and graphene nanoplatelets;

wherein said blend includes no other dispersant, no other surfactant, and no other stabilizing molecule besides said second nanoscale material.

10. The method according to claim 9, wherein said magnetic material comprises iron or nickel.

11. A method of forming a stable dispersion of at least one first nanoscale material with a dispersant, surfactant, or stabilizing molecule consisting of a second nanoscale material, said method consisting of the steps of:

a) blending said first nanoscale material, said second nanoscale material, a magnetic material added as a dopant, and a solvent to form a blend, said second nanoscale material being present in said blend in an amount from 5 wt. % to 500 wt. % of a total amount of the first nanoscale material in said blend;

b) processing said blend by ultrasonication so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week; and c) processing said stable dispersion further to form buckypaper with magnetic properties;

wherein said first nanoscale material is a mixture of graphene nanoplatelets and carbon nanotubes, said carbon nanotubes are not functionalized, said second nanoscale material is graphene oxide, and said solvent is an organic solvent or deionized water, and wherein said blend includes no other dispersant, no other surfactant, and no other stabilizing molecule besides said second nanoscale material.

12. A method of forming a stable dispersion of at least one first nanoscale material with a dispersant, surfactant, or stabilizing molecule consisting of a second nanoscale material, said method consisting of the steps of:

a) blending said first nanoscale material, said second nanoscale material, and a solvent to form a blend, said second nanoscale material being present in said blend in an amount from 5 wt. % to 500% of a total amount of the first nanoscale material present in the blend; and b) processing said blend so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week;

wherein said stable dispersion is composed so as to be an ink;

wherein said first nanoscale material is not functionalized and is at least one member selected from the group consisting of single-walled carbon nanotubes, thin-walled carbon nanotubes, double-walled carbon nanotubes and multi-walled carbon nanotubes;

wherein said second nanoscale material is selected from the group consisting of graphene, graphene oxide and graphene nanoplatelets; and wherein said blend includes no other dispersant, no other surfactant, and no other stabilizing molecule besides said second nanoscale material.

13. A method of forming a stable dispersion of at least one first nanoscale material with a dispersant, surfactant, or stabilizing molecule consisting of a second nanoscale material, wherein said second nanoscale material is a single layer graphene oxide, said method consisting of the steps of:

a) blending said first nanoscale material, said single layer graphene oxide and a solvent to form a blend, said second nanoscale material being present in said blend in an amount from 5 wt. % to 500 wt. % of a total amount of the first nanoscale material present in the blend; and b) processing said blend so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week;

wherein said first nanoscale material is not functionalized and is selected from the group consisting of single-walled carbon nanotubes, thin-walled carbon nanotubes, double-walled carbon nanotubes and multi-walled carbon nanotubes; and wherein said blend includes no other dispersant, no other surfactant, and no other stabilizing molecule besides said single layer graphene oxide.

14. The method according to claim 13, wherein said first nanoscale material is present in the blend in an amount of 0.01 to 5 weight percent.

15. The method according to claim 14, wherein said graphene oxide is present in the blend in an amount of 5 to 125 weight percent of said amount of said first nanoscale material.

16. The method according to claim 15 wherein said first nanoscale material consists of said multi-walled carbon nanotubes or said single-walled carbon nanotubes.

17. The method according to claim 16, wherein said solvent is deionized water.

18. A method of forming a stable dispersion of at least one first nanoscale material with a dispersant, surfactant, or stabilizing molecule consisting of a second nanoscale material, said method consisting of the steps of:

a) blending said first nanoscale material, said second nanoscale material, and a solvent to form a blend, said second nanoscale material being present in said blend in an amount from 5 wt. % to 500 wt. % of a total amount of the first nanoscale material present in the blend; and b) processing said blend by ultrasonication so as to deagglomerate and disperse the first nanoscale material as well as the second nanoscale material in said blend and thus form a stable dispersion in which 100% of the first nanoscale material dispersed in said stable dispersion remains in suspension for at least 24 hours and at least 70% of the first nanoscale material dispersed in said stable dispersion remains in suspension for at least one week;

wherein said first nanoscale material is not functionalized and is at least one member selected from the group consisting of single-walled carbon nanotubes, thin-walled carbon nanotubes, double-walled carbon nanotubes and multi-walled carbon nanotubes;

wherein said first nanoscale material is present in said blend in an amount of 0.01 to 5 weight percent;

wherein said second nanoscale material is a graphene oxide; and wherein said blend includes no other dispersant, no other surfactant, and no other stabilizing molecule besides said graphene oxide.

19. The method according to claim 18, wherein said solvent is deionized water.

20. The method according to claim 18, wherein said solvent is an organic compound and said organic compound is N-methylpyrrolidone or dimethiyformamide.

21. The method according to claim 18, wherein said stable dispersion is colloidal.

22. The method according to claim 1, wherein said blend is processed by high shear mixing to form said stable dispersion.

23. The method according to claim 1, wherein said stable dispersion is colloidal.

24. The method according to claim 7, wherein said solvent of said blend is removed by heating said blend at a temperature of from 125° C. to 250° C. after said processing by said ultrasonication.

25. The method according to claim 1, wherein said stable dispersion is colloidal.

26. A method of forming a stable dispersion of at least one first nanoscale material with a dispersant, surfactant, or stabilizing molecule consisting of a second nanoscale material, said method consisting of the steps of:

a) blending said first nanoscale material, said second nanoscale material, and a solvent to form a blend, said second nanoscale material being present in said blend in an amount from 5 wt. % to 500% of a total amount of the first nanoscale material present in the blend;

b) processing said blend so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week, and c) depositing said stable dispersion onto a substrate by spin coating, dip coating, drop cast, screen printing or other printing and coating methods to yield a conductive film;

wherein said stable dispersion is composed so as to be an ink;

wherein said first nanoscale material is not functionalized and is at least one member selected from the group consisting of single-walled carbon nanotubes, thin-walled carbon nanotubes, double-walled carbon nanotubes and multi-walled carbon nanotubes;

wherein said second nanoscale material is selected from the group consisting of graphene, graphene oxide and graphene nanoplatelets; and wherein said blend includes no other dispersant, no other surfactant, and no other stabilizing molecule besides said second nanoscale material.

27. A method of forming a stable dispersion of at least one first nanoscale material with a dispersant, surfactant, or stabilizing molecule consisting of a second nanoscale material, said method consisting of the steps of:

a) blending said first nanoscale material, said second nanoscale material, and a solvent to form a blend, said second nanoscale material being present in said blend in an amount from 5 wt. % to 500% of a total amount of the first nanoscale material present in the blend;

b) processing said blend by ultrasonification so as to deagglomerate and disperse the first nanoscale material as well as the second nanoscale material in said blend and thus to form a stable dispersion in which 100% of the first nanoscale material dispersed in said stable dispersion remains in suspension for at least 24 hours and at least 70% of the first nanoscale material dispersed in said stable dispersion remains in suspension for at least one week; and c) removing said solvent by heating said blend at a temperature of from 125° C. to 250° C. after said processing by said ultrasonication;

whereby said stable dispersion formed thereby is composed so as to be an ink;

wherein said first nanoscale material is not functionalized and is at least one member selected from the group consisting of single-walled carbon nanotubes, thin-walled carbon nanotubes, double-walled carbon nanotubes and multi-walled carbon nanotubes;

wherein said second nanoscale material is selected from the group consisting of graphene, graphene oxide and graphene nanoplatelets; and wherein said blend includes no other dispersant, no other surfactant, and no other stabilizing molecule besides said second nanoscale material.

28. The method according to claim 12, wherein said stable dispersion is colloidal.

29. The method according to claim 13, wherein said stable dispersion is deposited onto a substrate by spin coating, dip coating, drop cast, screen printing or other printing and coating methods to yield a conductive film.

30. The method according to claim 13, wherein said solvent of said blend is removed by heating said blend at a temperature of from 125° C. to 250° C. after said processing by said ultrasonication.

31. The method according to claim 13. wherein said stable dispersion is colloidal.

* * * * *